United States Patent
Steiner et al.

(10) Patent No.: US 8,964,964 B2
(45) Date of Patent: Feb. 24, 2015

(54) INTERRUPTIBLE WORK REASSIGNMENT

(71) Applicant: Avaya Inc., Basking Ridge, NJ (US)

(72) Inventors: Robert C. Steiner, Broomfield, CO (US); Gene Uba, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/764,504

(22) Filed: Feb. 11, 2013

(65) Prior Publication Data

US 2014/0226810 A1    Aug. 14, 2014

(51) Int. Cl.
*H04M 3/00* (2006.01)
*H04M 3/523* (2006.01)

(52) U.S. Cl.
CPC .................................. *H04M 3/5233* (2013.01)
USPC ................................ 379/265.12; 379/265.01

(58) Field of Classification Search
CPC ..... H04M 3/51; H04M 3/523; H04M 3/5175; H04M 3/5233
USPC ........................... 379/265.01–265.02, 265.12
See application file for complete search history.

(56) References Cited

U.S. PATENT DOCUMENTS

| | | | | |
|---|---|---|---|---|
| 6,134,530 | A * | 10/2000 | Bunting et al. | 705/7.25 |
| 7,787,609 | B1 | 8/2010 | Flockhart et al. | |
| 7,817,796 | B1 | 10/2010 | Clippinger et al. | |
| 2004/0054743 | A1* | 3/2004 | McPartlan et al. | 709/206 |
| 2010/0235218 | A1 | 9/2010 | Erhart et al. | |
| 2010/0296417 | A1 | 11/2010 | Steiner | |
| 2011/0125793 | A1 | 5/2011 | Erhart et al. | |
| 2011/0125826 | A1 | 5/2011 | Erhart et al. | |
| 2011/0255683 | A1 | 10/2011 | Flockhart et al. | |

* cited by examiner

*Primary Examiner* — Rasha Al Aubaidi
(74) *Attorney, Agent, or Firm* — Sheridan Ross P.C.

(57) ABSTRACT

A contact center is described along with various methods and mechanisms for administering the same. The contact center proposed herein provides the ability to, among other things, mark a work item as interruptible. The work item may receive an interruptible marking when the work item is assigned to an adequately-matched agent rather than a well-matched. Processing of the work item by the adequately-matched agent may be interrupted if the well-matched agent becomes available prior to the work item being completed by the adequately-matched agent.

20 Claims, 5 Drawing Sheets

INTERRUPTIBLE WORK REASSIGNMENT

FIELD OF THE DISCLOSURE

The present disclosure is generally directed toward communications and more specifically toward contact centers.

BACKGROUND

Contact center performance is often measured by at least two competing factors—customer satisfaction and agent efficiency. Customer satisfaction is often maximized if work items are assigned to the best agent possible, but wait times are minimized. Agent efficiency is often maximized if agents are regularly working rather than sitting idle.

It often occurs in contact center that a work item is routed to a less than optimal agent. In other words, many contact centers favor agent efficiency over customer satisfaction and, therefore, will assign contacts to an idle agent even if that agent is not the best-suited agent to process the work item. The logic behind making such a routing decision is that it is better to assign the work item to anyone sooner than to wait for the best agent.

Unfortunately, prior art contact centers would make such a routing decision and never reconsider whether such a decision was in the best interest of the contact center or whether the decision could be reversed based on a change in contact center conditions (e.g., the better agent becoming available just after assignment of the work item to the less than optimal agent). Thus, the window of opportunity for making intelligent work item routing decisions has traditionally been limited to the time between when a work item is received and when the work item is routed to an agent. After assignment to an agent, the work assignment logic is no longer concerned with the work item. While it may be possible for the originally-assigned agent to transfer or re-route the contact, this is often done without further input from the work assignment logic. Even if the agent places the work item back into a work item queue for re-routing by the work assignment logic, the same short-sighted assignment process will be executed.

SUMMARY

It is with respect to the above issues and other problems that the embodiments presented herein were contemplated. This disclosure proposes, among other things, the ability to mark a work item as interruptible and, therefore, enable the work item to be re-considered for work assignment (or re-assignment more appropriately) even though the work item is being processed or is ready to be processed by a contact center resource.

More specifically, the work item may be marked as interruptible if the work item is assigned to a less than optimal agent (e.g., an adequately-matched agent). This adequately-matched agent may have been the best agent available for processing the work item when the work item was initially considered for assignment to agents. However, the work assignment engine may have made the initial work assignment decision knowing that a better agent (e.g., an optimal or better-suited agent) exists in the contact center. If the work assignment engine assigned the work item to the adequately-matched agent rather than the optimal agent, the work assignment engine may mark or decorate the work item or a data structure associated with the work item to indicate that the work item is assigned to an agent, but is interruptible. Furthermore, the marking or decoration placed on such a work item (or the work item's data structure) may indicate that the work item is still eligible for work assignment decisions (or re-assignment decisions) when new agents become available. Thus, if an optimal or better-suited agent becomes available after the interruptible work item is assigned to an adequately-matched agent, the work assignment engine may cause the work item to be re-assigned to the optimal or better-suited agent.

In some embodiments, the work item may be re-assigned to the optimal or better-suited agent to the exclusion of the originally-assigned adequately-matched agent. In other words, the work assignment engine may entirely take the work item away from the originally-assigned agent and re-assign the work item to the optimal or better-suited agent. In some embodiments, an optimal or better-suited agent may correspond to an agent requested by a customer, but the requested agent is not available.

In some embodiments, the work item may be re-assigned to the optimal or better-suited agent and the originally-assigned agent may be provided with the option to maintain some level of involvement with the processing of the work item. As an example, the originally-assigned agent may be allowed to join a conference between the customer that escalated the work item and the optimal or better-suited agent. As another example, the originally-assigned agent may be allowed to passively (e.g., no interaction options) or actively (e.g., options to interact with the customer, the optimal or better-assigned agent, or both) view a chat between the customer and the optimal or better-assigned agent. As another example, the originally-assigned agent may be allowed to view the final results (e.g., reply email) that are sent back to the customer. Any involvement on the part of the originally-assigned agent may be considered or counted toward training time for that agent.

In some embodiments, it may be possible for the work assignment engine to weigh or balance the benefits associated with interrupting an adequately-matched agent so that the work item can be re-assigned to an optimal or better-suited agent. Conversely or simultaneously, the work assignment engine may also consider perceived costs. The considerations for re-assignment may include the perceived benefits (or costs) of having the work item processed by the optimal or better-suited agent versus the perceived benefits (or costs) of having the adequately-matched agent process the work item. Alternatively or additionally, the considerations for re-assignment may include the perceived benefits (or costs) of having the optimal or better-suited agent handle the already assigned work item versus the perceived benefits (or costs) of having the optimal or better-suited agent handle another work item that has yet to be assigned to an agent. Alternatively or additionally, the considerations for re-assignment may include the perceived benefits (or costs) of having the adequately-matched agent process the work item to which they are already assigned versus the perceived benefits (or costs) of having the adequately-matched agent process some other work item. The perceived benefits and/or costs may be expressed in terms of potential revenue, potential expense, potential efficiencies/inefficiencies, potential customer score, potential for up-sell, potential for loss of customer, potential for delay, etc. Accordingly, the work assignment engine may consider the re-assignment of an interruptible work item by also accounting for other contact center conditions.

It is, therefore, one aspect of the present disclosure to enable an agent that becomes available to take over or interrupt the completion of a work item from an adequately-matched agent if the newly-available agent is an optimal or better-suited agent. As a result, a customer can receive a more robust response from the optimal or better-suited agent. An adequately-matched agent could also learn from the optimal or better-suited agent's response.

In accordance with at least some embodiments, a method is disclosed that comprises:

receiving a contact in a contact center;

generating a work item to represent the contact within the contact center;

determining processing requirements for the work item;

analyzing resources within the contact center to determine which among the resources is qualified for processing the work item based on the processing requirements determined for the work item;

based on the analysis of the resources, identifying a well-matched agent and an adequately-matched agent as being qualified for processing the work item, the well-matched agent being better qualified to process the work item that the adequately-matched agent;

assigning the work item to the adequately-matched agent instead of the well-matched agent in response to determining that the well-matched agent is not currently-available to process the work item;

determining that the work item is interruptible and marking the work item as interruptible; and routing the work item to the adequately-matched agent.

The term "well-matched agent" refers to any agent or collection of agents that are an optimal agent within a contact center for processing a work item or any agent or collection of agents within a contact that are better-suited to process a work item as compared to an agent to whom the work item is already assigned. In other words, a well-matched agent may correspond to an optimal or better-suited agent as compared to an adequately-matched agent and the well-matched agent may be considered well-matched for any variety of reasons (e.g., due to customer selection, due to previous interactions with the customer, due to relative skills/attributes, etc.).

The term "adequately-matched agent" refers to any agent or collection of agents in a contact center that are available to process a work item. An adequately-matched agent may correspond to an agent having at least one skill or attribute that matches a processing requirement of a work item or an adequately-matched agent may correspond to any agent or collection of agents that are available to process a work item, regardless of whether or not the agent or collection of agents actually have a skill or attribute that matches a processing requirement of the work item.

The term "agent" or "agent" can be construed to include one or more human agents operating one or more contact center endpoints. In some embodiments, an agent may correspond to a contact center supervisor, a trainee, or an agent. An agent may process a work item with or without the assistance of an automated processing resource. For instance, an automated system may be configured to generate proposed responses to work items or questions within work items. An agent may be allowed to select which among the automatically-generated responses are the best response and/or edit one of the automatically-generated responses. Accordingly, it may be possible that an agent is considered to be "processing" a work item when, in fact, an automated resource is being used to assist the agent in the processing of the work item.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
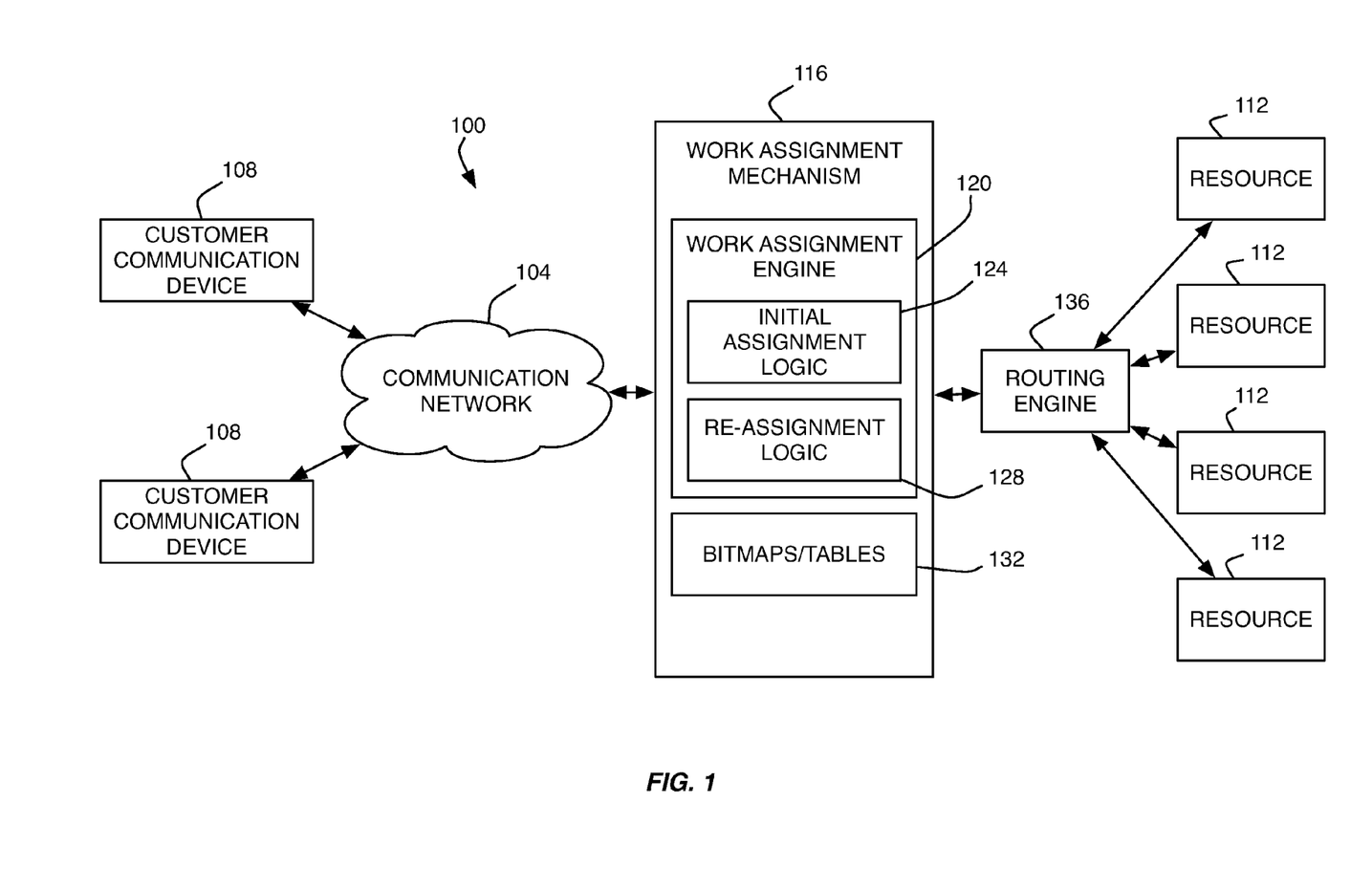
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering a contact center in which a plurality of resources 112 are distributed to handle work items (in the form of contacts) from the customer communication devices 108.

In accordance with at least some embodiments of the present disclosure, the communication network 104 may comprise any type of known communication medium or collection of communication media and may use any type of protocols to transport messages or message fragments between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. Patent Publication No. 2010/0296417 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. Patent Publication Nos. 2010/0235218, 2011/0125826, and 2011/0125793, filed May 20, 2010, Feb. 17, 2010, and Feb. 17, 2010, respectively, each of which are hereby incorporated herein by reference in their entirety.

The format of the work item may depend upon the capabilities of the communication device 108 and the format of the communication. In some embodiments, work items are logical representations within a contact center (e.g., the work assignment mechanism 116 of the contact center) of work to be performed in connection with servicing a communication/contact received at the contact center. The communication or contact associated with a work item may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 136 to connect the communication device 108 which initiated the communication with the assigned resource 112. The connection between the customer communication device 108 and a resource 112 may be effected by the routing engine 136 assigning one or more communication resources (e.g., sockets, buffers, physical ports, etc.) to establish a communication path (e.g., media stream such as RTP or SRTP) between the communication device 108 and resource 112. In some embodiments, the communication path established between the communication device 108 and resource 112 may also carry call control signaling, however, it may also be possible to maintain the signaling path at the work assignment mechanism 116. Alternatively, the customer communication device 108 may be initially connected to a conference bridge or the like by the routing engine 136 before any resource 112 is assigned to the contact. The work assignment mechanism 116 may later decide which resource(s) 112 are going to be assigned to the contact and, upon making such a decision, instruct the routing engine 136 to connect the selected resource(s) 112 to the conference bridge where the contact is being parked.

Although the routing engine 136 is depicted as being separate from the work assignment mechanism 116, the routing engine 136 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, tablet, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 136. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. Patent Application Serial No. 2011/0255683 filed Sep. 15, 2010, the entire contents of which are hereby incorporated herein by reference.

More specifically, the work assignment engine 120 can generate bitmaps/tables 132 and determine, based on an analysis of the bitmaps/tables 132, which of the plurality of processing resources 112 is eligible and/or qualified to receive a work item and further determine which of the plurality of processing resources 112 is best suited to handle the processing needs of the work item. In some embodiments, the work assignment engine 120 may also comprise the functionality to assign and route work items to adequately-matched agents even though the work assignment engine 120 has identified a well-matched agent (e.g., a better-qualified agent than the adequately-matched agent) as a resource 112 within the contact center that is capable of processing the work item. The work assignment engine 120, however, may be restricted from initially assigning the work item to the well-matched agent because, for example, the well-matched agent is not available or is currently processing some other work item(s). In such a scenario, the work assignment engine 120 may be configured to initially assign the work item to the adequately-matched agent, but also consider re-assigning the work item to the well-matched agent once the well-matched agent becomes available.

In situations of work item surplus, the work assignment engine 120 can also make the opposite determination (i.e., determine optimal assignment of a work item to a resource 112). In some embodiments, the work assignment engine 120 is configured to achieve true one-to-one matching by utilizing the bitmaps/tables 132 and any other similar type of data structure.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

As noted above, the work assignment engine 120 may comprise the functionality to initially assign work items to an adequately-matched agent and then re-assign the work item at a later time to a well-matched agent. In some embodiments, the work assignment engine 120 may leverage one or both of initial assignment logic 124 and re-assignment logic 128 to achieve these objectives. The initial assignment logic 124 and re-assignment logic 128, although depicted as being separate modules, may actually be combined into a single module. Moreover, one or both of the logic modules 124, 128 do not necessarily need to be executed by the work assignment engine 120, but rather than be executed by any other component of combination of components depicted and described herein.

In some embodiments, the initial assignment logic 124 is configured to make work assignment decisions for work items that have yet to be assigned to a resource 112 or agent. The initial assignment logic 124 may be configured to consider every resource in the resource pool 212, regardless of whether that resource is available or unavailable to receive the work item. In some embodiments, the initial assignment logic 124 may be configured to identify a well-matched agent for the work item as well as an adequately-matched agent. If the well-matched agent is available during the initial assignment phase, then the initial assignment logic 124 may assign the work item to the well-matched agent. If, however, the well-matched agent is not available, then the initial assignment logic 124 may assign the work item to an adequately-matched agent rather than waiting for the well-matched agent—particularly in the interest of getting the work item into some sort of processing. In accordance with embodiments, the initial assignment logic 124 may be configured to decorate or mark the work item as being interruptible if the work item is assigned to an adequately-matched agent instead of a well-matched agent.

The re-assignment logic 128 may correspond to a module within the work assignment engine 120 that is capable of analyzing work items that have already been assigned to agents (e.g., adequately-matched agents) when a well-matched agent becomes available. Of course, the re-assignment logic 128 may also be configured to consider every work item in the contact center (whether available, unavailable, currently being processed, etc.), but it can quickly dismiss any work item that is not decorated or marked with as interruptible. If the re-assignment logic 128 determines that at least one work item in the contact center is interruptible, then the re-assignment logic 128 may further analyze the benefits and/costs associated with re-assigning the work item to the now available well-matched agent prior to making such a re-assignment decision.

In some embodiments, if the re-assignment logic 128 determines that a work item assigned to an adequately-matched agent should be re-assigned to a well-matched agent, then the re-assignment logic 128 may notify the routing engine 136 to implement the necessary re-routing of the work item. The re-assignment logic 128 may also be configured to provide the adequately-matched agent with the option of gaining training experience from the now re-assigned work item. As some examples, the adequately-matched agent may be provided with the option to passively or actively participate in the processing of the work item with the well-matched agent that has been assigned to the interruptible work item.

Figure 2:
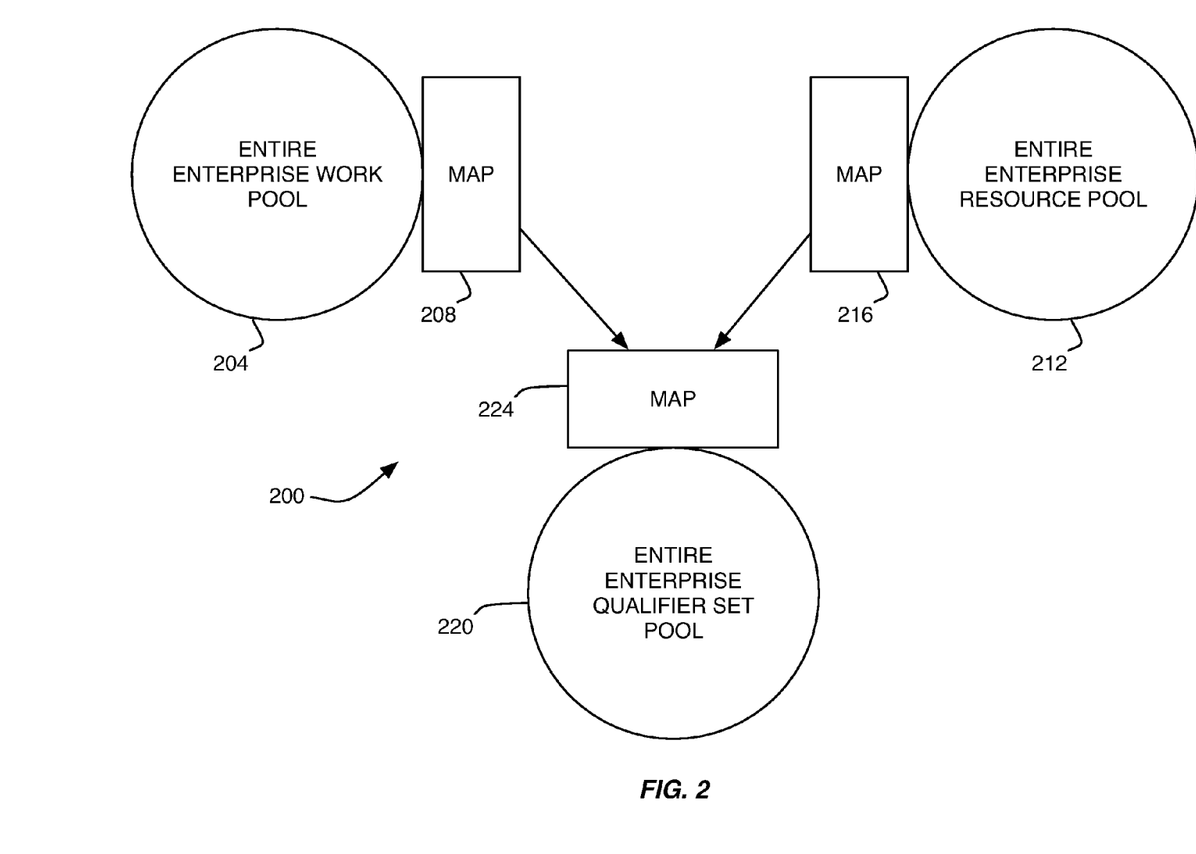
FIG. 2 is a block diagram depicting pools and bitmaps that are utilized in accordance with embodiments of the present disclosure.

FIG. 2 depicts exemplary data structures 200 which may be incorporated in or used to generate the bitmaps/tables 132 used by the work assignment engine 120. The exemplary data structures 200 include one or more pools of related items. In some embodiments, three pools of items are provided, including an enterprise work pool 204, an enterprise resource pool 212, and an enterprise qualifier set pool 220. The pools are generally an unordered collection of like items existing within the contact center. Thus, the enterprise work pool 204 comprises a data entry or data instance for each work item within the contact center 100 at any given time.

In some embodiments, the population of the work pool 204 may be limited to work items waiting for service by or assignment to a resource 112, but such a limitation does not necessarily need to be imposed. Rather, the work pool 204 may contain data instances for all work items in the contact center regardless of whether such work items are currently assigned and being serviced by a resource 112 or not. The differentiation between whether a work item is being serviced (i.e., is assigned to a resource 112) may simply be accounted for by altering a bit value in that work item's data instance. Alteration of such a bit value may result in the work item being disqualified for further assignment to another resource 112 unless and until that particular bit value is changed back to a value representing the fact that the work item is not assigned to a resource 112, thereby making that resource 112 eligible to receive another work item.

Similar to the work pool 204, the resource pool 212 comprises a data entry or data instance for each resource 112 within the contact center. Thus, resources 112 may be accounted for in the resource pool 212 even if the resource 112 is ineligible due to its unavailability because it is assigned to a work item or because a human agent is not logged-in. The ineligibility of a resource 112 may be reflected in one or more bit values.

The qualifier set pool 220 comprises a data entry or data instance for each qualifier set within the contact center. In some embodiments, the qualifier sets within the contact center are determined based upon the attributes or attribute combinations of the work items in the work pool 204. Qualifier sets generally represent a specific combination of attributes for a work item. In particular, qualifier sets can represent the processing criteria for a work item and the specific combination of those criteria. Each qualifier set may have a corresponding qualifier set identified "qualifier set ID" which is used for mapping purposes. As an example, one work item may have attributes of language=French and intent=Service and this combination of attributes may be assigned a qualifier set ID of "12" whereas an attribute combination of language=English and intent=Sales has a qualifier set ID of "13." The qualifier set IDs and the corresponding attribute combinations for all qualifier sets in the contact center may be stored as data structures or data instances in the qualifier set pool 220.

In some embodiments, one, some, or all of the pools may have a corresponding bitmap. Thus, a contact center may have at any instance of time a work bitmap 208, a resource bitmap 216, and a qualifier set bitmap 224. In particular, these bitmaps may correspond to qualification bitmaps which have one bit for each entry. Thus, each work item in the work pool 204 would have a corresponding bit in the work bitmap 208, each resource 112 in the resource pool 212 would have a corresponding bit in the resource bitmap 216, and each qualifier set in the qualifier set pool 220 may have a corresponding bit in the qualifier set bitmap 224. Furthermore, each bitmap 208, 216, 224 may be recalculated every time the state of the contact center changes, every time a new work item enters the contact center, every time a new resource becomes available, etc.

Figure 3:
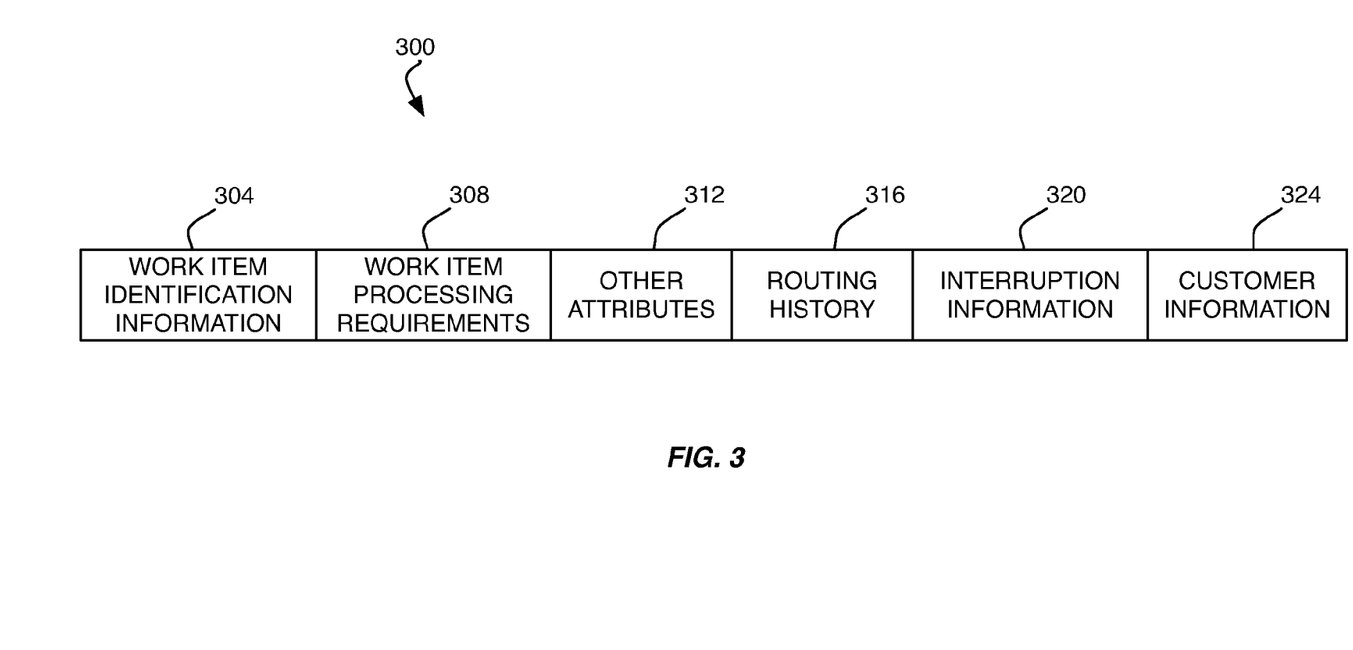
FIG. 3 is a block diagram depicting a data structure in accordance with embodiments of the present disclosure.

With reference now to FIG. 3, details of another data structure 300 will be described in accordance with embodiments of the present disclosure. In some embodiments, the data structure 300 can be used to further define attributes or metadata about work items in the work item pool 204. Any information contained in the data structure 300 can be expressed in one or more work item bitmaps 208 without departing from the scope of the present disclosure. Examples of fields that may be provided in the data structure 300 include, without limitation, a work item identification information field 304, a work item processing requirements field 308, an attributes field 312, a routing history field 316, an interruption information field 320, and a customer information field 324.

In some embodiments, the work item identification information field 304 may comprise information that enables a unique identification of the work item within the contact center. For instance, a pseudo-randomly generated work item identification number may be contained in the work item identification information field. Other examples of identification information include, without limitation, work item ID numbers, customer ID information, work item status, and so on.

The work item processing requirements information field 308 may comprise any information that describes processing requirements specific to the work item. Examples of information that may be maintained in the work item processing requirements information field 308 include, without limitation, language requirements, media requirements (e.g., text, TTY, voice, video, chat, SMS, email, etc.), skill requirements (e.g., sales, product support, billing, expertise of particular skills, combinations thereof, etc.), time of response requirements (e.g., time that work item was created, current wait time, estimated wait time, quoted wait time, etc.), customer level (e.g., gold, platinum, regular, etc.), goals of servicing the work item, product or service related to work item, and so on.

The other attributes information field 312 may comprise information similar to the work item processing requirements, but the attributes information may not necessarily correspond to information used for assigning the work item to an agent. Examples of information that may be maintained in the other attributes information field 312 include information such as contact type, service level goals and whether such goals have or can been achieved, related work items (e.g., if a customer escalated multiple contacts), etc.

The routing history information field 316 may comprise information that describes where the work item has been routed within the contact center. For instance, if the work item is initially received at the work assignment engine 120 and then transferred to a first agent, the routing history field 316 would reflect that information. If the work item is subsequently re-assigned, transferred, or rerouted back to the work assignment engine 120 or to a second agent, that information would also be reflected in the routing history field 316. The routing history information field 316 may also contain information related to routing history of previous work items escalated by the same customer, thereby enabling the work assignment engine 120 to try and route subsequent work items from that customer back to the same agent. It should be noted that in such a scenario, the same agent may be considered a well-matched agent even if that agent was not previously considered a well-matched agent for the customer's previous work items because there is an inherent advantage to having customers interface with the same agent. The routing history information field 316 may also contain information that describes whether the customer has been connected with a conference or multiple agents simultaneously.

The interruption information field 320 may contain a decoration or mark indicating whether the work item is interruptible (or not). This information can be represented with a single bit, where one value of the bit represents that the work item is interruptible while the other value of the bit represents that the work item is not interruptible. In some embodiments, the interruption information field 320 may also contain information that describes whether a work item has been interrupted and re-assigned to another agent and, if so, how the interruption occurred. Other information that may be maintained in the interrupt information field 320 includes information describing what options are available to an agent when they are processing this work item and it gets interrupted for re-assignment (e.g., whether the originally-assigned agent is able to passively or actively observe the completion of the work item processing). It should be appreciated that the interruption information field 320 is a data field that can be accessed and manipulated by the re-assignment logic 128.

The customer information field 324 may contain information describing the customer including currently-known customer information, information provided by the customer (e.g., by interaction with an IVR system), customer history information, and/or prospective customer information. The information in the customer information field 324 may be obtained from the customer, from a customer relationship management (CRM) database, from the Internet or social media feeds, or from any other source regardless of whether the source is internal or external to the contact center.

Figure 4:
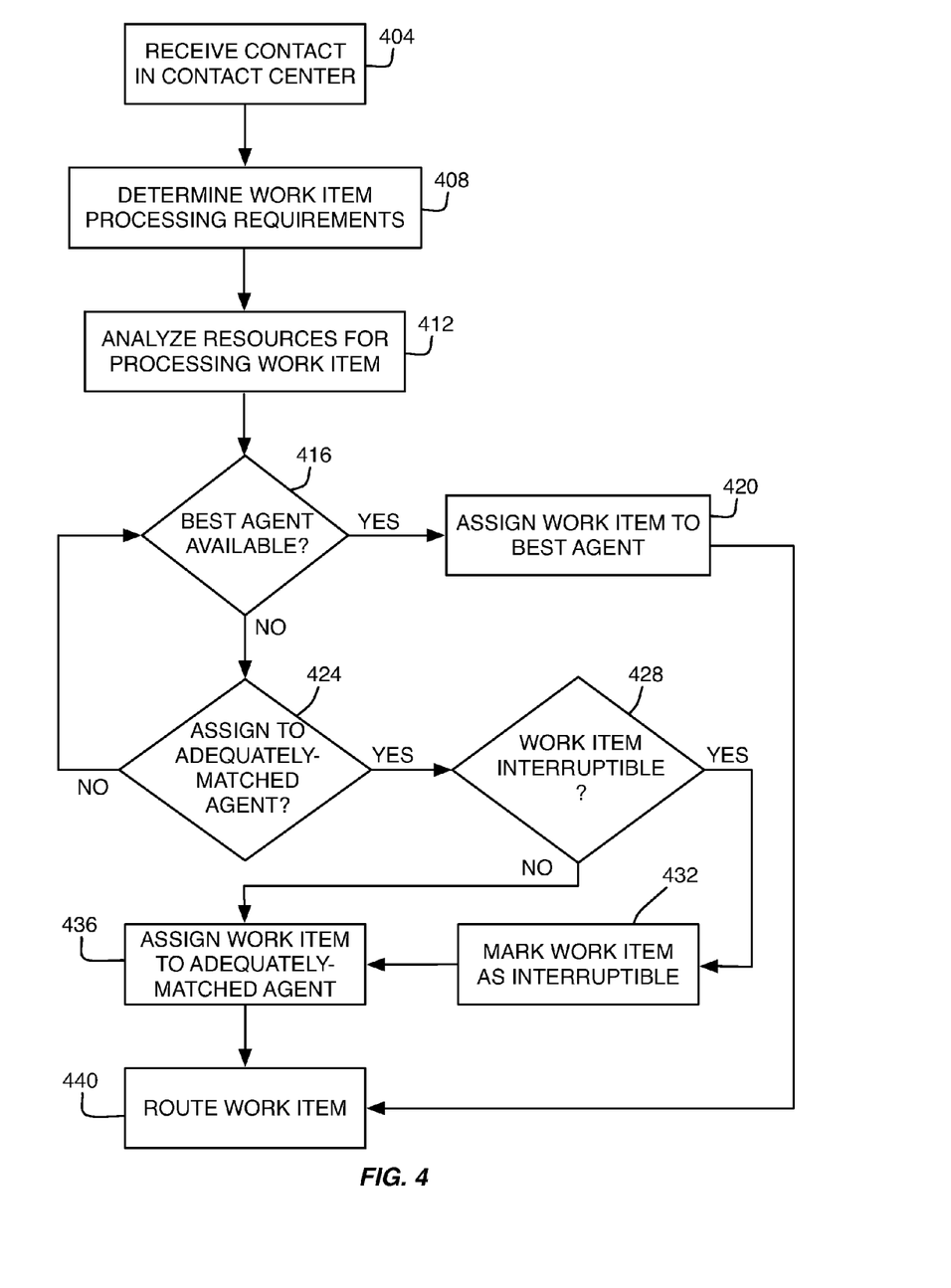
FIG. 4 is a flow diagram depicting a work item assignment method in accordance with embodiments of the present disclosure.

With reference now to FIG. 4, a method of assigning and routing a work item in a contact center will be described in accordance with at least some embodiments of the present disclosure. The method begins when a contact is received in the contact center (step 404). The received contact may be in any real time, near-real time, or non-real time communication initiated by one or multiple customer communication devices 108.

Once the contact is received in the contact center, a corresponding work item is generated at the work assignment engine 120 to represent that contact and the processing needs associated with that contact within the contact center. As part of generating the work item, the work assignment engine 120 determines the work item processing requirements for the work item (step 408). This information can be obtained from any data field in data structure 300 and/or from any other information source. Generally speaking, the processing requirements for a work item may include language requirements, skill requirements (including skill type and level of skill for each type), media requirements, and the like.

The work assignment engine 120 then generates an appropriate resource bitmap 216 based on the processing requirements of the work item (e.g., the resource bitmap 216 is calculated specifically for the work item). This bitmap 216 is then used by the initial assignment logic 124 to analyze which resources 112 (e.g., agents) are qualified and/or best-suited to process the work item (step 412).

During its analysis of the resource pool 212, the initial assignment logic 124 may analyze every single resource in the contact center, regardless of whether or not the resource is currently available to process the work item. In some embodiments, during this analysis, the work assignment engine 120 is able to determine if a best agent for the work item is available (step 416). In other words, the work assignment engine 120 is capable of determining whether there is a currently-available well-matched agent for the work item. If a well-matched agent is currently available, then the work item is assigned to the well-matched agent (step 420) and the routing engine 136 is informed of the assignment decision, thereby allowing the routing engine 136 to route the work item to the selected agent (step 440).

If, on the other hand, a well-matched agent is not current available as determined by step 416, then the method continues by determining if an adequately-matched agent is currently available to process the work item or at least have the work item assigned thereto (step 424). If this query is answered negatively, then the method returns to step 416. If the query is answered positively, then the method proceeds by determining if the work item is interruptible (step 428). If the initial assignment logic 124 determines that the work item is interruptible, then the method proceeds by marking the work item as interruptible (step 432). This mark or decoration can be registered by assigning an appropriate bit value to an interruptible field, for example, in data structure 300. The marking of the work item as interruptible may also include determining what other steps can and/or should be taken in the event of interruption and this information may also be written to the data structure 300.

After the work item has been appropriately marked as interruptible, or if the work item was not interruptible as determined in step 428, the method proceeds with the work assignment engine 120 assigning the work item to the adequately-matched agent (step 436). As noted above, the adequately-matched agent may correspond to an agent that is qualified to process the work item but is not as well qualified as at least one other agent (e.g., a well-matched agent).

After the work item has been assigned to the adequately-matched agent, the work assignment decision is communicated to the routing engine 136 to enable routing of the work item to the selected agent (step 440).

Figure 5:
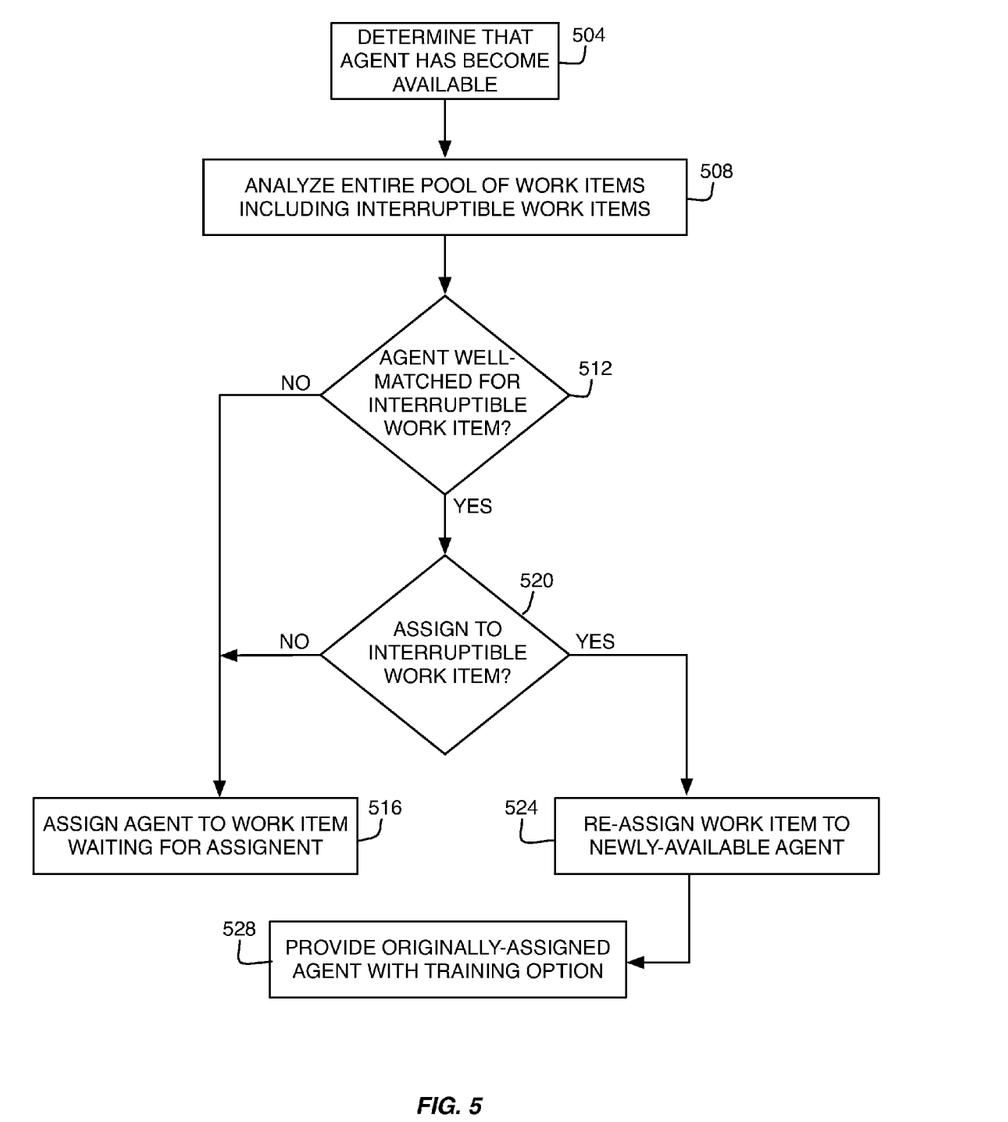
FIG. 5 is a flow diagram depicting an interruption method in accordance with embodiments of the present disclosure.

With reference now to FIG. 5, a method of interrupting work item processing will be described in accordance with at least some embodiments of the present disclosure. The method begins when it is determined that an agent has become available (step 504). This may occur when the agent completes processing a work item, signs into the contact center, returns from a break, or the like. Once the agent has been identified as available, the work assignment engine 120 determines processing capabilities for the agent and generates an appropriate work item bitmap 208 to enable the work assignment engine 120 to analyze the entire pool of work items 204 for a specific work item to route to the now available agent (step 508). In particular, the work assignment engine 120 may analyze work items that have yet to be assigned to an agent as well as work items that have already been assigned and/or started being processed by an agent.

Based on its analysis of the work items, the work assignment engine 120, with the assistance of the re-assignment logic 128, determines if the agent is well-matched for an interruptible work item (step 512). In other words, the work assignment engine 120 determines if the agent is better qualified to handle at least one work item that is already assigned to an agent but is marked as interruptible. If this query is answered negatively, then the work assignment engine 120 is free to assign the agent to a work item waiting for assignment (step 516).

If the query of step 512 is answered positively, then the work assignment engine 120 further determines whether or not to interrupt the work item and re-assign the work item to the newly available agent (step 520). In some embodiments, this decision may account for the expected profits and/or costs of having the currently-assigned agent complete the work item versus the expected profits and/or costs of having the newly available agent complete the work item. This decision may also account for the amount of processing already performed by the adequately-matched agent. For instance, if the work item is less than 10% completed or has been assigned to the adequately-matched agent for less than a predetermined amount of time, then the it may be acceptable to re-assign the work item to the well-matched agent. If, however, the work item is more than a predetermined percentage completed (e.g., more than 50% completed) or the work item has been assigned to the adequately-matched agent for more than a predetermined amount of time, then it may be advisable not to interrupt the work item.

If the query of step 520 is answered negatively, then the method proceeds to step 516. If, however, the query of step 520 is answered positively, then the work item is re-assigned to the newly-available agent (step 524). Furthermore, if an option was made available for the adequately-assigned agent to be involved with further processing of the work item for training purposes, then the adequately-assigned agent can be provided with a training option (step 528).

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
receiving a contact in a contact center;
generating a work item to represent the contact within the contact center;
determining processing requirements for the work item;
analyzing resources within the contact center to determine which among the resources is qualified for processing the work item based on the processing requirements determined for the work item;
based on the analysis of the resources, identifying a well matched agent and an adequately matched agent as being qualified for processing the work item, the well matched agent being better qualified to process the work item than the adequately matched agent;
assigning the work item to the adequately matched agent instead of the well matched agent in response to determining that the well matched agent is not currently available to process the work item;
determining, in response to assigning the work item to the adequately matched agent, that the work item is interruptible, such that the assignment of the work item to the adequately matched agent may be interrupted by an assignment of the work item to the well matched agent, and marking the work item as interruptible; and
routing the work item to the adequately matched agent.

2. The method of claim 1, further comprising:
determining that the well matched agent has become available after the work item has been routed to the adequately matched agent; and
determining whether to assign the well matched agent to a second work item not yet assigned to an agent or to interrupt the adequately-matched agent and reassign the work item to the well matched agent.

3. The method of claim 2, further comprising:
considering potential work item processing success by analyzing at least one of the following factors: projected profits associated with having the adequately-assigned agent process the work item, projected costs associated with having the adequately-assigned agent process the work item, projected profits associated with having the well-assigned agent process the work item, and projected costs associated with having the well-assigned agent process the work item; and
based on the consideration of potential work item processing success, determining to re-assign the work item to the well matched agent.

4. The method of claim 3, further comprising:
informing the adequately matched agent that the work item has been re-assigned to the well matched agent.

5. The method of claim 4, wherein informing the adequately matched agent comprises providing the adequately matched agent with an opportunity to be at least one of passively and actively involved in completion of processing of the work item by the well matched agent.

6. The method of claim 3, wherein a customer associated with the contact is not informed of the re-assignment of the work item from the adequately matched agent to the well matched agent.

7. The method of claim 1, wherein marking the work item as being interruptible comprises assigning a bit in a work item data structure a predetermined value.

8. The method of claim 7, wherein marking the work item further comprises providing information regarding training opportunities within the data structure.

9. The method of claim 1, wherein determining that the work item is interruptible includes determining that the work item corresponds to at least one of a near-real time and non-real time contact.

10. A non-transitory computer readable medium having stored thereon instructions that cause a computing system to execute a method, the instructions comprising:
instructions configured to determine that a contact has been received in a contact center;
instructions configured to generate a work item to represent the contact within the contact center;
instructions configured to determine processing requirements for the work item;
instructions configured to analyze resources within the contact center to determine which among the resources is qualified for processing the work item based on the processing requirements determined for the work item;
instructions configured to, based on the analysis of the resources, identify a well matched agent and an adequately matched agent as being qualified for processing the work item, the well matched agent being better qualified to process the work item than the adequately matched agent;
instructions configured to assign the work item to the adequately matched agent instead of the well matched agent in response to determining that the well matched agent is not currently-available to process the work item; and
instructions configured to determine, in response to assigning the work item to the adequately matched agent, that the work item is interruptible, such that the assignment of the work item to the adequately matched agent may be interrupted by an assignment of the work item to the well matched agent, and marking the work item as interruptible.

11. The computer readable medium of claim 10, wherein the instructions further comprise:
instructions configured to determine that the well matched agent has become available after the work item has been routed to the adequately matched agent; and
instructions configured to determine whether to assign the well matched agent to a second work item not yet assigned to an agent or to interrupt the adequately matched agent and reassign the work item to the well matched agent.

12. The computer readable medium of claim 11, wherein the instructions further comprise:
instructions configured to consider potential work item processing success by analyzing at least one of the following factors: projected profits associated with having the adequately-assigned agent process the work item, projected costs associated with having the adequately-assigned agent process the work item, projected profits associated with having the well-assigned agent process the work item, and projected costs associated with having the well-assigned agent process the work item; and
instructions configured to, based on the consideration of potential work item processing success, determine to re-assign the work item to the well matched agent.

13. The computer readable medium of claim 12, wherein the instructions configured to re-assign the work item are further configured to inform the adequately matched agent that the work item has been re-assigned to the well matched agent.

14. The computer readable medium of claim 13, wherein informing the adequately matched agent comprises providing the adequately matched agent with an opportunity to be at least one of passively and actively involved in completion of processing of the work item by the well matched agent.

15. The computer readable medium of claim 11, wherein a customer associated with the contact is not informed of the re-assignment of the work item from the adequately matched agent to the well matched agent.

16. The computer readable medium of claim 15, wherein marking the work item as being interruptible comprises assigning a bit in a work item data structure a predetermined value.

17. A contact center, comprising:
a processor to execute programming instructions stored in memory; and
memory comprising a work assignment engine, the work assignment engine comprising re-assignment logic instructions that, when executed by the processor, determine that an agent has become available, identify at least one work item already assigned to an adequately matched agent as being interruptible by referring to a marking of the at least one work item indicating that the at least one work item is interruptible and eligible to receive re-assignment decisions, determine that the agent is a well matched agent for the at least one interruptible work item such that the well matched agent is better qualified to process the at least one interruptible work item than the adequately matched agent, and re-assign the at least one interruptible work item to the well matched agent.

18. The contact center of claim 17, wherein the re-assignment logic is further configured to assess at least one of potential profits and costs associated with re-assigning the at least one interruptible work item to the well matched agent prior to re-assigning the at least one interruptible work item.

19. The contact center of claim 18, wherein during an assessment of at least one of potential profits and costs, the re-assignment logic is configured to analyze at least one of the following factors: projected profits associated with having the adequately-assigned agent process the work item, projected costs associated with having the adequately-assigned agent process the work item, projected profits associated with having the well-assigned agent process the work item, and projected costs associated with having the well-assigned agent process the work item.

20. The contact center of claim 17, wherein identifying the at least one work item already assigned to an adequately matched agent as being interruptible includes analyzing a single bit value in a work item data structure.

* * * * *